(12) United States Patent  (10) Patent No.: US 8,989,510 B2
Muramatsu  (45) Date of Patent: Mar. 24, 2015

(54) CONTRAST ENHANCEMENT USING GRADATION CONVERSION PROCESSING

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 273 days.

(21) Appl. No.: 13/086,868

(22) Filed: Apr. 14, 2011

(65) Prior Publication Data

US 2011/0286680 A1  Nov. 24, 2011

(30) Foreign Application Priority Data

Apr. 15, 2010 (JP) .................................. 2010-094311

(51) Int. Cl.
G06K 9/40 (2006.01)
H04N 1/407 (2006.01)
G06T 5/00 (2006.01)
H04N 1/60 (2006.01)
H04N 5/232 (2006.01)

(52) U.S. Cl.
CPC ............... *H04N 1/407* (2013.01); *G06T 5/008* (2013.01); *H04N 1/6027* (2013.01); *H04N 5/232* (2013.01)
USPC ............................ 382/255; 382/274; 382/275

(58) Field of Classification Search
CPC ........................................................ G06T 5/00
USPC .................................................. 382/255, 274
See application file for complete search history.

(56) References Cited

U.S. PATENT DOCUMENTS 5,875,262 A * 2/1999 Asada ........................... 382/169
6,035,065 A * 3/2000 Kobayashi et al. ........... 382/201
6,101,271 A * 8/2000 Yamashita et al. ............ 382/167
6,529,243 B1 * 3/2003 von Stein et al. ............. 348/340
7,088,390 B2 * 8/2006 Mori et al. ..................... 348/254
7,092,122 B2 * 8/2006 Iwaki ............................. 358/1.9
7,663,677 B2 * 2/2010 Shiraishi ....................... 348/254

(Continued)

FOREIGN PATENT DOCUMENTS

JP  B2-3512581  3/2004
JP  A-2004-222076  8/2004

(Continued)

OTHER PUBLICATIONS

May 22, 2012 Office Action issued in Japanese Patent Application No. 2010-094311 (with translation).

(Continued)

*Primary Examiner* — Gandhi Thirugnanam
(74) *Attorney, Agent, or Firm* — Oliff PLC

(57) ABSTRACT

A non-transitory computer-readable storage medium storing an image processing program causing a computer to execute an image processing on image data to be processed, the image processing program including an obtaining step obtaining the image data, a gradation conversion processing step performing gradation conversion processing on the image data at an intermediate part of gradation according to input/output characteristics having characteristics to which characteristics to reduce a contrast are added, and a correcting step making a correction to enhance a local contrast indicative of contrast at a local part of an image for the image data subjected to the gradation conversion processing by using a gain curve in which a degree of enhancement changes in accordance with luminance information of a pixel to be processed, and thus, bright and dark part gradations are improved while suppressing a change in a hue and color saturation as well as maintaining an apparent contrast.

10 Claims, 11 Drawing Sheets

(56) References Cited

U.S. PATENT DOCUMENTS

| | | | |
|---|---|---|---|
| 7,880,771 B2* | 2/2011 | Toyoda | 348/222.1 |
| 7,949,201 B2* | 5/2011 | Suzuki | 382/274 |
| 8,570,407 B2* | 10/2013 | Muramatsu | 348/254 |
| 2002/0163670 A1* | 11/2002 | Takahira | 358/3.27 |
| 2003/0016306 A1* | 1/2003 | Ogata et al. | 348/671 |
| 2003/0161518 A1* | 8/2003 | Vuylsteke | 382/128 |
| 2004/0004666 A1* | 1/2004 | Sano | 348/254 |
| 2004/0189818 A1* | 9/2004 | Tsuruoka et al. | 348/221.1 |
| 2005/0013506 A1* | 1/2005 | Yano | 382/274 |
| 2007/0080975 A1* | 4/2007 | Yamashita et al. | 345/591 |
| 2008/0252791 A1* | 10/2008 | Mitsunaga | 348/673 |
| 2008/0253650 A1* | 10/2008 | Kuniba | 382/167 |
| 2009/0041350 A1* | 2/2009 | Utagawa et al. | 382/169 |
| 2010/0128332 A1* | 5/2010 | Wakazono et al. | 358/521 |
| 2010/0328535 A1* | 12/2010 | Okui et al. | 348/578 |
| 2011/0128404 A1* | 6/2011 | Muramatsu | 348/222.1 |
| 2011/0286680 A1* | 11/2011 | Muramatsu | 382/255 |

FOREIGN PATENT DOCUMENTS

| | | | |
|---|---|---|---|
| JP | A-2008-263475 | 10/2008 | |
| JP | A-2010-28363 | 2/2010 | |
| JP | A-2010-34848 | 2/2010 | |
| WO | WO 2010007726 A1 * | 1/2010 | H04N 5/235 |

OTHER PUBLICATIONS

Oct. 30, 2012 Office Action issued in Japanese Patent Application No. 2010-094311 (with translation).

Feb. 21, 2012 Office Action issued in Japanese Patent Application No. 2010-094311 (with translation).

Office Action dated Nov. 5, 2013 issued in Japanese Patent Application No. 2013-015591 (with translation).

* cited by examiner

F I G. 1
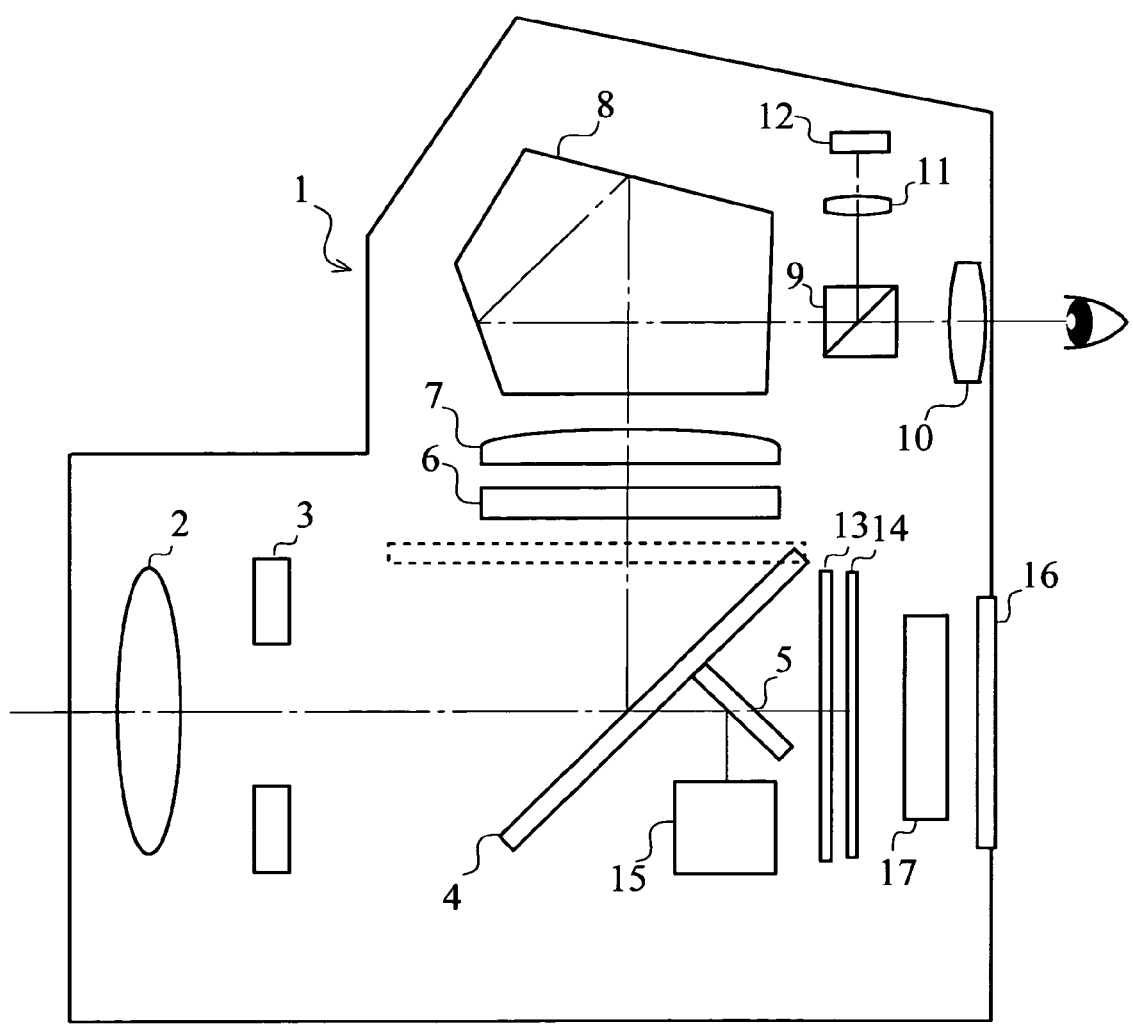

F I G. 2
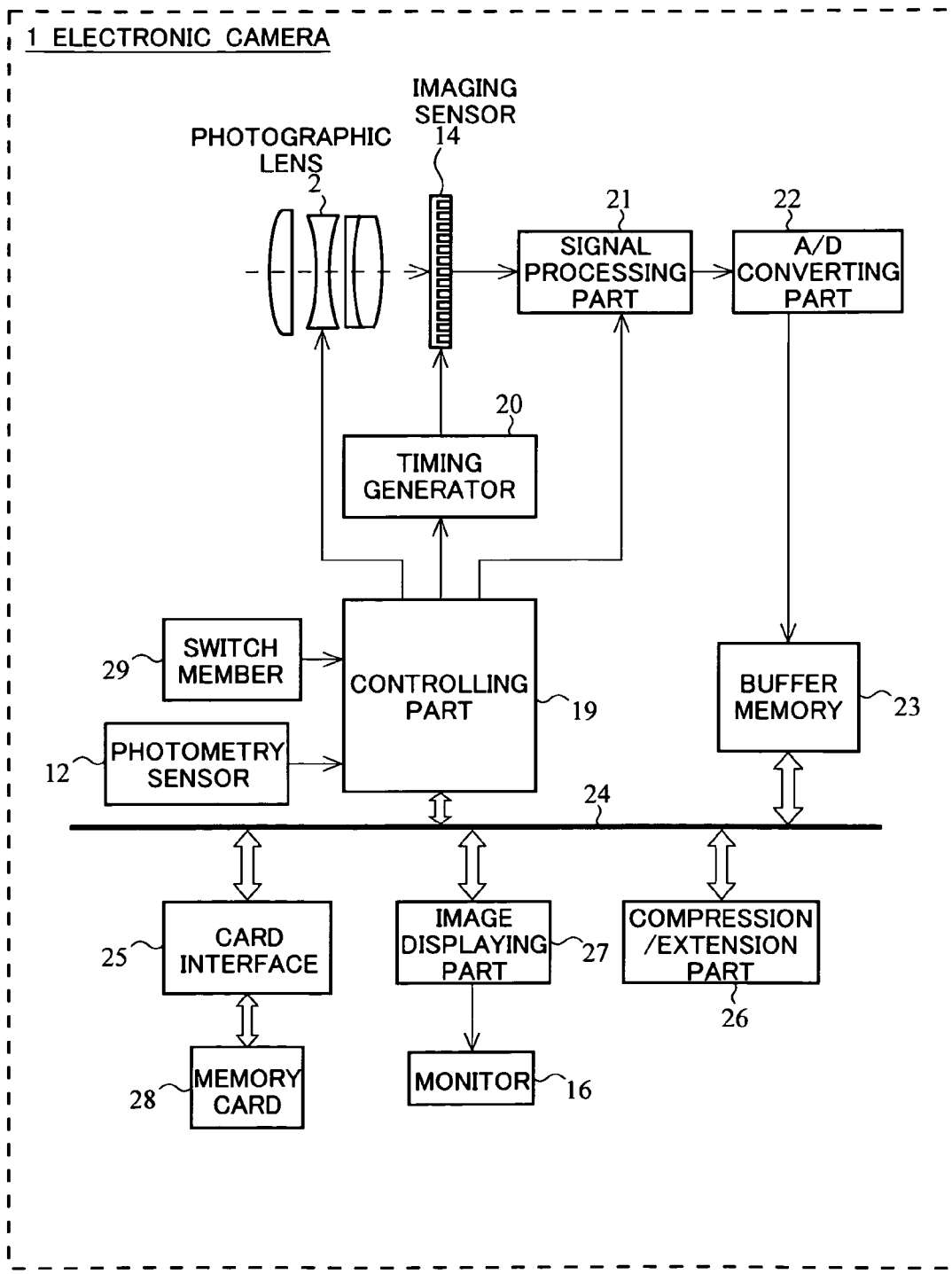

F I G. 4
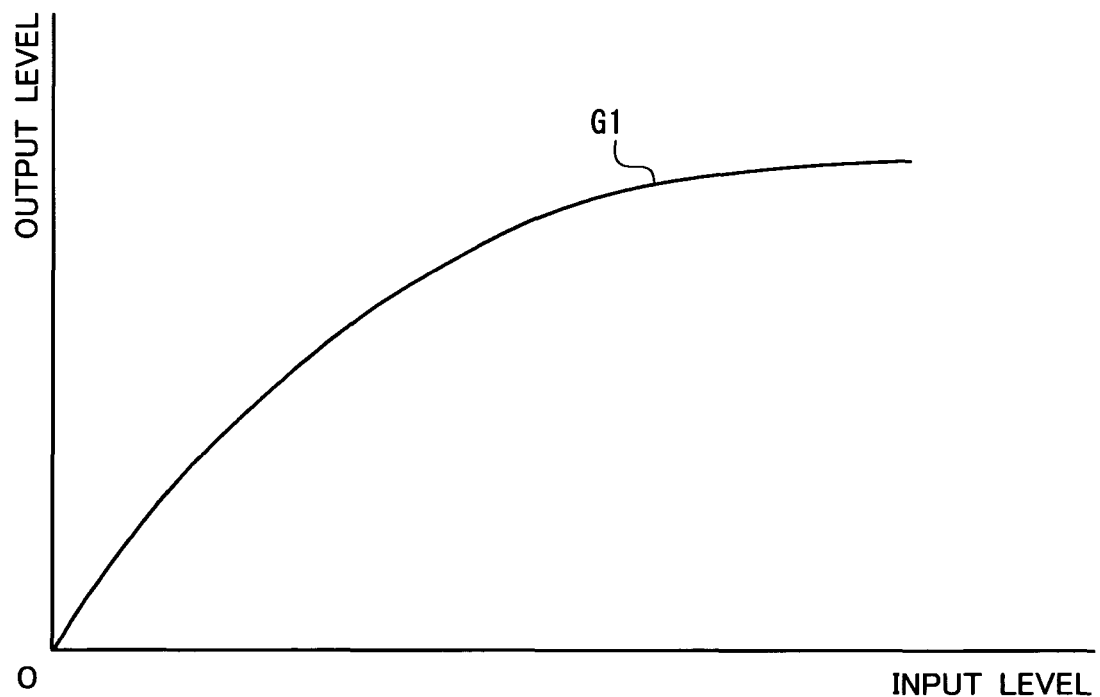

F I G. 5
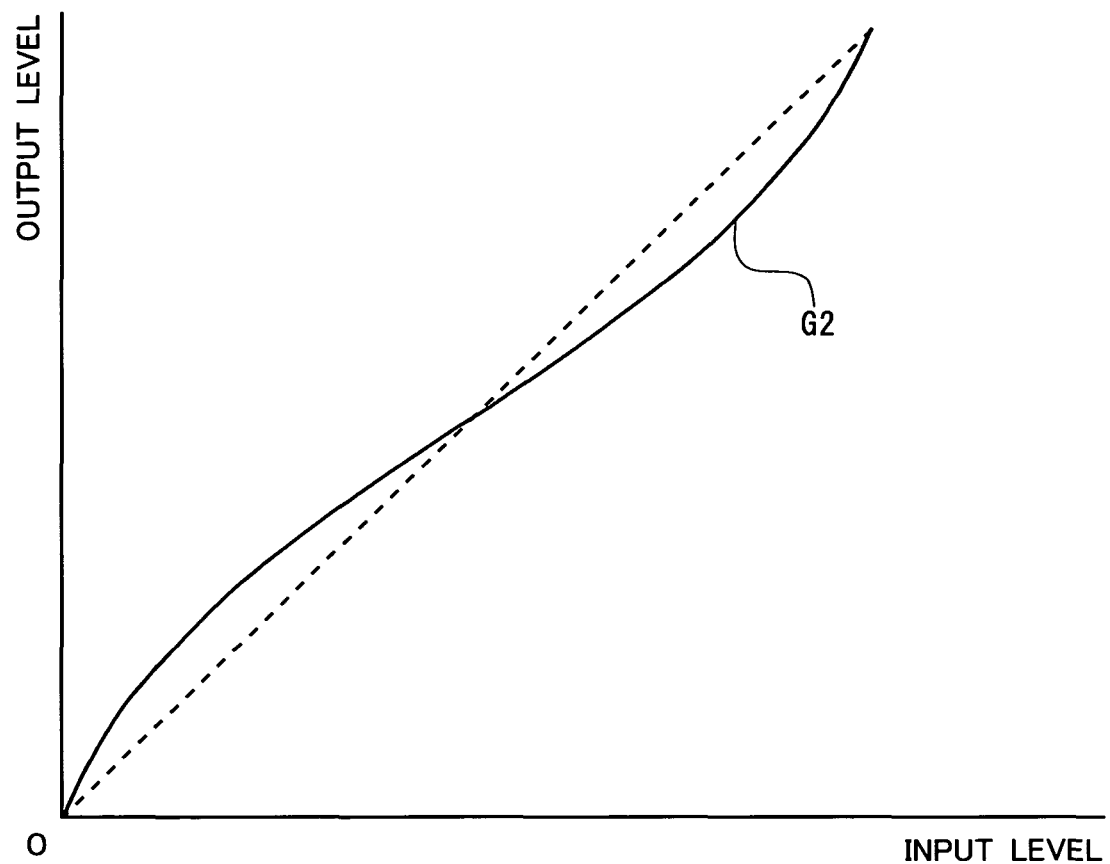

F I G. 7
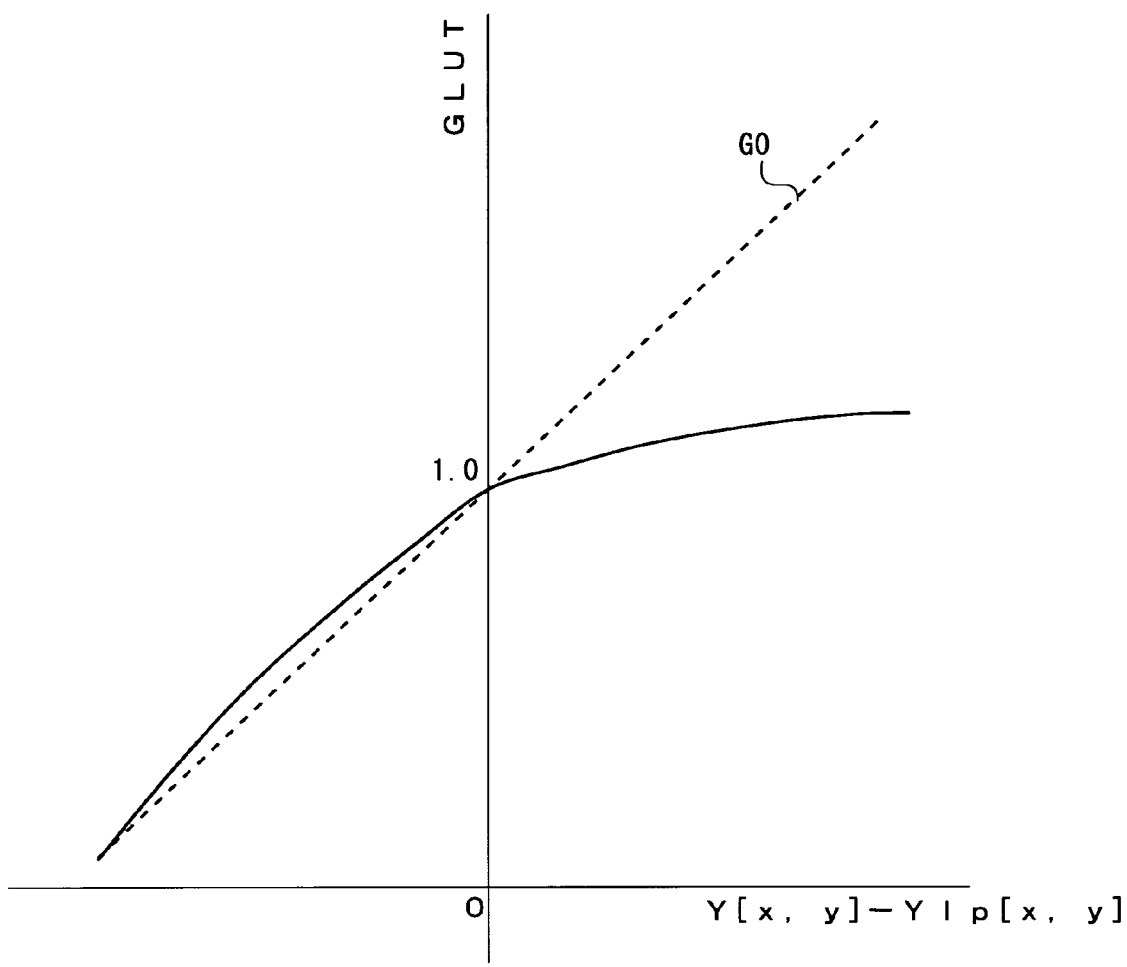

ic camera is output to output equipment such as a CRT monitor and printer, gradation conversion processing using a gradation curve corresponding to the output equipment is performed to improve the appearance. If such gradation conversion processing is not performed, the appearance is marred by the flare, black floating, external light reflection, etc., of the output equipment. For gradation conversion processing, a so-called S-shaped gradation curve is used in addition to a gradation curve corresponding to the output equipment. By adjusting contrast using the S-shaped gradation curve, it is possible to obtain an output image with high contrast by the output equipment (for example, Japanese Unexamined Patent Application Publication No. 2004-222076).

CONTRAST ENHANCEMENT USING GRADATION CONVERSION PROCESSING

CROSS REFERENCE TO RELATED APPLICATIONS

This application is based upon and claims the benefit of priority from Japanese Patent Application No. 2010-094311, filed on Apr. 15, 2010, the entire contents of which are incorporated herein by reference.

BACKGROUND

1. Field

The present application relates to a storage medium storing an image processing program which performs an image processing on image data to be processed, an image processing device, and an image processing method.

2. Description of the Related Art

When image data generated by an imaging device such as an electronic camera is output to output equipment such as a CRT monitor and printer, gradation conversion processing using a gradation curve corresponding to the output equipment is performed to improve the appearance. If such gradation conversion processing is not performed, the appearance is marred by the flare, black floating, external light reflection, etc., of the output equipment. For gradation conversion processing, a so-called S-shaped gradation curve is used in addition to a gradation curve corresponding to the output equipment. By adjusting contrast using the S-shaped gradation curve, it is possible to obtain an output image with high contrast by the output equipment (for example, Japanese Unexamined Patent Application Publication No. 2004-222076).

Furthermore, contour enhancement processing for enhancing contrast is also performed in order to improve the appearance. The contour enhancement processing includes a method of enhancing contours by adding high-frequency components to the original image data, a method of enhancing contours using a so-called contour enhancement filter (for example, Japanese Patent No. 3512581), etc.

In the gradation conversion processing of the invention in the above-described Japanese Unexamined Patent Application Publication No. 2004-222076, while it is possible to enhance contrast, there is a case where the contrast of the bright part gradation is reduced or the dark part gradation is shadowed and blocked up. Furthermore, when gradation conversion processing using an S-shaped curve is performed on each of the R, G, B values, there used be such a problem that the hue and color saturation of each of the bright part gradation, the intermediate part gradation, and the dark part gradation change.

Moreover, the contour enhancement processing of the invention in the above-described Japanese Patent No. 3512581 used to have such a problem that when contour enhancement processing is performed with a large radius, the change in color saturation becomes conspicuous or the blown out highlights of the bright part gradation become more likely to occur.

SUMMARY

In view of the above-mentioned problems lying in the prior art, a proposition of the present application is to perform an image processing capable of improving bright part gradation and dark part gradation while suppressing a change in a hue and color saturation as well as maintaining an apparent contrast.

In order to solve the above-mentioned problems, a non-transitory computer-readable storage medium storing an image processing program of the present application is a non-transitory computer-readable storage medium storing an image processing program causing a computer to execute an image processing on image data to be processed, the image processing program including an obtaining step obtaining the image data, a gradation conversion processing step performing a gradation conversion processing on the image data at an intermediate part of gradation according to input/output characteristics having characteristics to which characteristics to reduce a contrast are added, and a correcting step of making a correction to enhance a local contrast indicative of a contrast at a local part of an image for the image data subjected to the gradation conversion processing by using a gain curve in which a degree of enhancement changes in accordance with luminance information of a pixel to be processed.

In addition, in the correcting step, it may also be possible to generate image data of a blurred image based on the image data and, when a value indicative of a difference between a luminance value in the image data and a luminance value in the image data of the blurred image is a positive value, to perform the correction using the gain curve that reduces the degree of enhancement in comparison with that when the value indicative of the difference is a negative value.

Furthermore, in the correcting step, it may also be possible to generate image data of a blurred image based on the image data and to perform the correction using the gain curve that reduces the degree of enhancement more as a value indicative of a difference between a luminance value in the image data and a luminance value in the image data of the blurred image becomes larger.

Moreover, in the correcting step, it may also be possible to generate image data of a blurred image based on the image data and to perform the correction using the gain curve that increases the degree of enhancement more as a value indicative of a difference between a luminance value in the image data and a luminance value in the image data of the blurred image becomes smaller.

Furthermore, it may also be possible to define the input/output characteristics by either one of a gradation curve having normal characteristics and a gradation curve having the characteristics to reduce the contrast, and one gradation curve having the normal characteristics to which the characteristics to reduce the contrast are added.

In addition, those in which the configuration relating to the present application is represented by converting it into an image processing device and an image processing method to perform the image processing on image data to be processed are also effective as specific embodiments of the present application.

According to the present application, it is possible to perform the image processing capable of improving the bright part gradation and dark part gradation while suppressing the change in the hue and color saturation as well as maintaining the apparent contrast.

BRIEF DESCRIPTION OF THE DRAWINGS

FIG. 1 is a diagram showing a configuration of an electronic camera 1 in a first embodiment.

FIG. 2 is a functional block diagram of the electronic camera 1 in the first embodiment.

FIG. 4 is a diagram for explaining a gradation curve.

FIG. 5 is another diagram for explaining a gradation curve.

FIG. 7 is a diagram for explaining a gamma curve.

DETAILED DESCRIPTION OF THE EMBODIMENTS

<First Embodiment>

Figure 3:
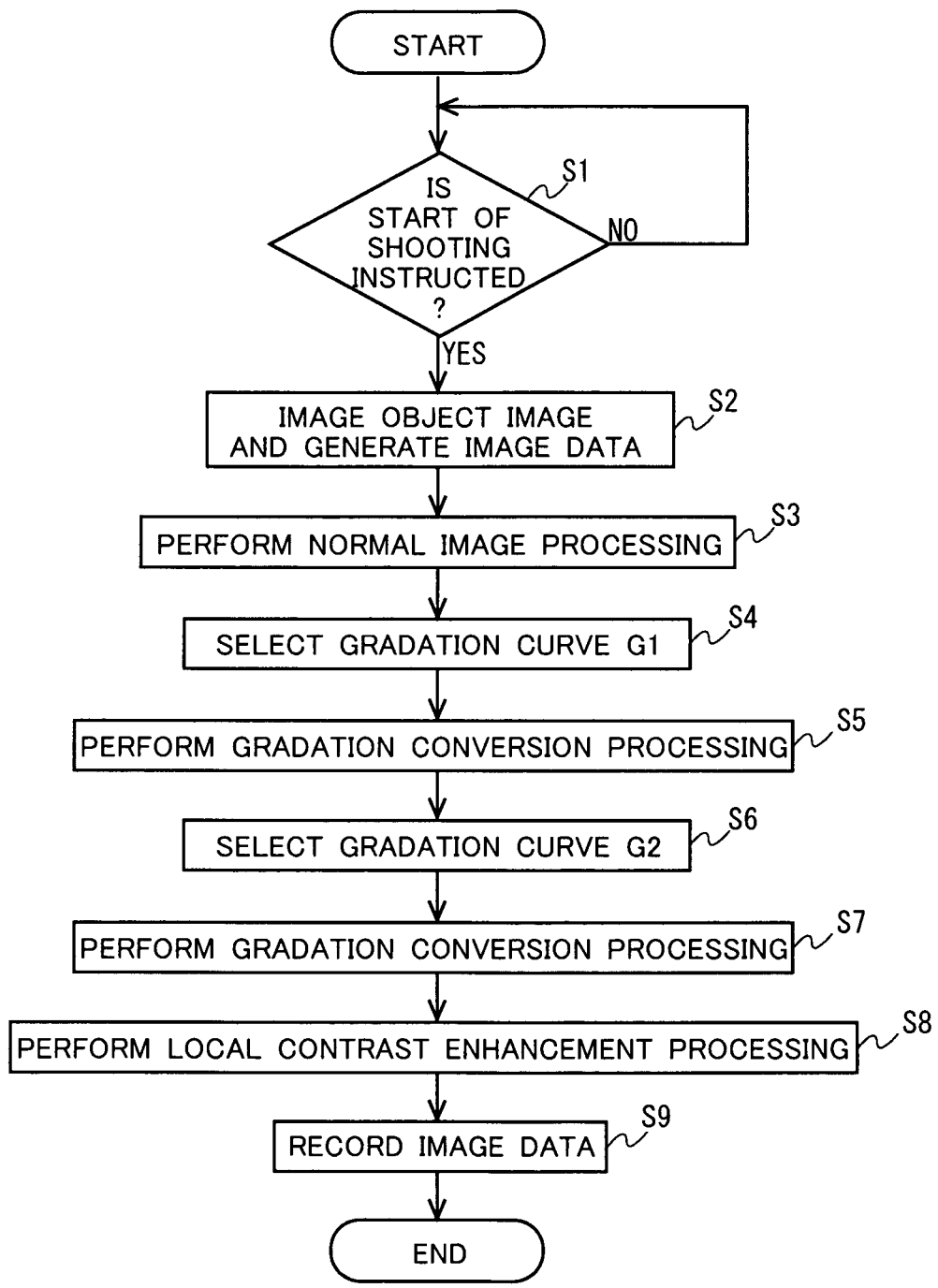
FIG. 3 is a flowchart showing the operation at the time of shooting of the electronic camera 1 in the first embodiment.

Hereinafter, a first embodiment of the present invention will be explained by using the drawings. In the first embodiment, a single-lens reflex electronic camera to which an image processing program of the present invention has been applied will be explained as an example.

FIG. 1 is a diagram showing a configuration of an electronic camera 1 in the first embodiment. As shown in FIG. 1, the electronic camera 1 includes a photographic lens 2, an aperture diaphragm 3, a quick return mirror 4, a sub mirror 5, a diffusing screen 6, a condenser lens 7, a pentaprism 8, a beam splitter 9, an eyepiece lens 10, an imaging lens 11, a photometry sensor 12, a shutter 13, an imaging sensor 14, and a focus detecting part 15.

The photometry sensor 12, for example, is a five-division photometry sensor. The imaging sensor 14 is a semiconductor device, such as a CCD (Charge Coupled Device) and CMOS (Complementary Metal Oxide Semiconductor). The focus detecting part 15 performs focus detection in a scheme of, for example, phase difference to detect the focused state of the photographic lens 2. In addition, the electronic camera 1 performs focus detection in a contrast scheme to detect the focused states of the photographic lens 2 based on luminance detected by the photometry sensor 12.

Moreover, the electronic camera 1 further includes a monitor 16, such as a liquid crystal monitor, to display an image generated by imaging, and a controlling part 17 to control each part. The controlling part 17 internally includes a memory, not shown schematically, and stores a program to control each part in advance.

At the time of non-shooting, that is, when shooting is not performed, the quick return mirror 4 is arranged at an angle of 45° as shown in FIG. 1. Then, light flux that has passed through the photographic lens 2 and the aperture diaphragm 3 is reflected from the quick return mirror 4 and guided to the eyepiece lens 10 via the diffusing screen 6, the condenser lens 7, the pentaprism 8, and the beam splitter 9. A user checks the composition by visually inspecting an object image via the eyepiece lens 10. In contrast, the light flux split upward by the beam splitter 9 is re-imaged on the imaging surface of the photometry sensor 12 via the imaging lens 11. In addition, the light flux that has passed through the quick return mirror 4 is guided to the focus detecting part 15 via the sub mirror 5.

In contrast, at the time of shooting, the quick return mirror 4 retracts to a position shown by a broken line, the shutter is released, and the light flux from the photographic lens 2 is guided to the imaging sensor 14.

FIG. 2 is a functional block diagram of the electronic camera 1 in the first embodiment. As shown in FIG. 2, in addition to the configuration in FIG. 1, the electronic camera 1 includes a timing generator 20, a signal processing part 21, an A/D converting part 22, a buffer memory 23, a bus 24, a card interface 25, a compression/extension part 26, and an image displaying part 27. The timing generator 20 supplies an output pulse to the imaging sensor 14. Furthermore, image data generated in the imaging sensor 14 is temporarily stored in the buffer memory 23 via the signal processing part 21 (including a gain adjusting part corresponding to the imaging sensitivity) and the A/D converting part 22. The buffer memory 23 is connected to the bus 24. To the bus 24, the card interface 25, the controlling part 17 explained in FIG. 1, the compression/extension part 26, and the image displaying part 27 are connected. The card interface 25 is connected to an attachable/detachable memory card 28 and stores image data in the memory card 28. In addition, to the controlling part 17, a switching member 29 (including a release button, not shown schematically), the timing generator 20, and the photometry sensor 12 of the electronic camera 1 are connected. Moreover, the image displaying part 27 displays an image etc. on the monitor 16 provided at the rear surface of the electronic camera 1.

The operation of the electronic camera 1 having the configuration explained as above at the time of shooting will be explained by using a flowchart shown in FIG. 3.

In step S1, the controlling part 17 determines whether or not start of shooting is instructed by a user via the switching member 29. Then, when determining that start of shooting is instructed, the controlling part 17 advances the step to step S2.

In step S2, the controlling part 17 controls each part and generates image data by imaging an object image by the imaging sensor 14. Image data generated by the imaging sensor 14 is stored temporarily in the buffer memory 23 via the signal processing part 21 and the A/D converting part 22.

In step S3, the controlling part 17 reads image data from the buffer memory 23 and performs the normal image processing. The normal image processing includes white balance adjustment, interpolation processing, color tone correction processing, etc. The specific method of each processing is the same as that of the publicly-known techniques, and thus, its explanation is omitted.

In step S4, the controlling part 17 selects a gradation curve G1. The gradation curve G1 is used in gradation conversion processing performed in step S5, to be described later, and is a gradation curve obtained by adding the publicly-known S-shaped characteristics to a gradation curve corresponding to output equipment, such as a CRT. The controlling part 17 stores two kinds of gradation curve (G1, G2) shown in FIG. 4 and FIG. 5 in advance in an internal memory, not shown schematically.

In step S5, the controlling part 17 performs gradation conversion processing on image data having been subjected to image processing in step S3 according to the gradation curve G1 selected in step S4. Details of gradation conversion processing are the same as those of the publicly-known techniques, and thus, their explanation is omitted.

In step S6, the controlling part 17 selects the gradation curve G2. The gradation curve G2 has the characteristics to reduce contrast at the intermediate part of gradation in comparison with an input/output of 1:1 (see the dotted line in FIG. 5) as shown in FIG. 5.

In step S7, the controlling part 17 performs the second gradation conversion processing on the image data having been subjected to the first gradation conversion processing in step S5 according to the gradation curve G2 selected in step S6. Details of gradation conversion processing are the same as those of the publicly-known techniques, and thus, their explanation is omitted. It should be noted that by performing gradation conversion processing according to the gradation curve G2 described above, the gradation is softened at the intermediate part of the gradation.

In step S8, the controlling part 17 performs local contrast enhancement processing on the image data having been subjected to the second gradation conversion processing in step S7. The local contrast is a contrast in a local region of an image.

The local contrast enhancement operation in each of pixels R [x, y], G [x, y], B [x, y] is performed by the following expression 1 to expression 6.

$$Y[x, y] = kr \cdot R[x, y] + kg \cdot G[x, y] + kb \cdot B[x, y] \quad \text{(Expression 1)}$$

$$Ylp[x, y] = \sum_{i=-d}^{d} \sum_{j=-d}^{d} \left( Y[x+i, y+j] \cdot Lpw((i^2 + j^2)^{1/2}) \right) \quad \text{(Expression 2)}$$

$$gain[x, y] = GLUT \cdot (Y[x, y] - Ylp[x, y]) \quad \text{(Expression 3)}$$

$$Rc[x, y] = gain[x, y] \cdot R[x, y] \quad \text{(Expression 4)}$$

$$Gc[x, y] = gain[x, y] \cdot G[x, y] \quad \text{(Expression 5)}$$

$$Bc[x, y] = gain[x, y] \cdot B[x, y] \quad \text{(Expression 6)}$$

Figure 6:
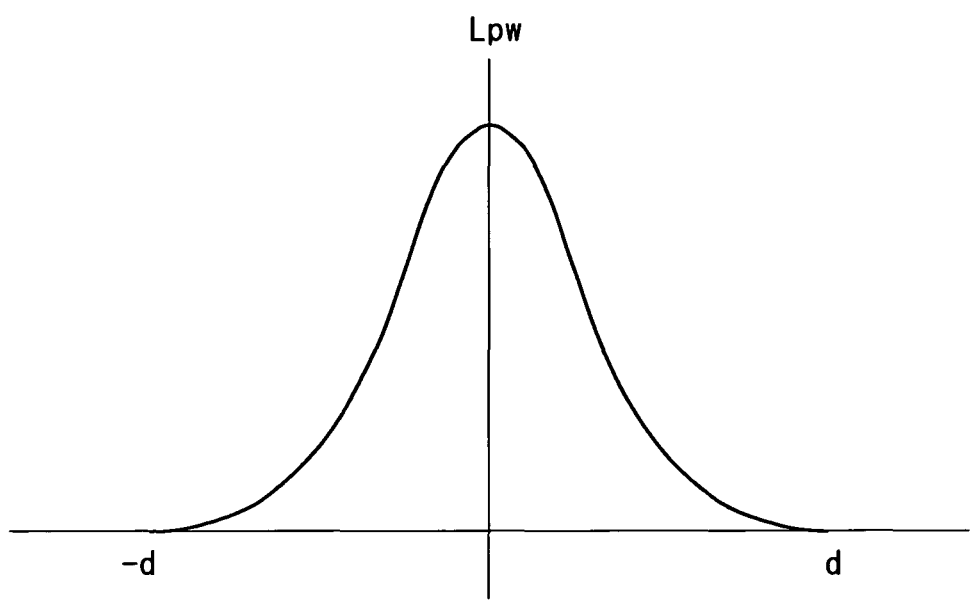
FIG. 6 is a diagram for explaining a low pass filter.

Y in the expression 1 represents a luminance value of a target pixel. Furthermore, kr, kg, kb in the expression 1 represent predetermined coefficients. Lpw in the expression 2 represents a low pass filter around the target pixel and the low pass filter has the characteristics shown in FIG. 6. The low pass filter is a low pass filter the half value width (d in FIG. 6) of which is as wide as 1/100 or more of the short side of the image. Consequently, Ylp in the expression 2 corresponds to the low pass value, which is the luminance value Y having been subjected to low pass processing, and thus, a set of Ylp represents a blurred image of a luminance image. Moreover, gain in the expression 3 represents a gain at the time of enhancement operation and GLUT in the expression 3 represents a gain curve used at the time of enhancement operation.

The gain curve GLUT is, as shown in FIG. 7, a gain curve in which the degree of enhancement at the time of enhancement operation differs depending on the value of (Y [x, y]−Ylp [x, y]). Then, when the value of (Y [x, y]−Ylp [x, y]) is a positive value (when the target pixel is brighter than the peripheral pixel), the gain is increased to enhance brightness more. In contrast, when the value of (Y [x, y]−Ylp [x, y]) is a negative value (when the target pixel is darker than the peripheral pixel), the gain is reduced to enhance darkness more. That is, the gain curve GLUT has such characteristics to enhance brightness more by the expression 3 when the target pixel is brighter than the peripheral pixel and to enhance darkness more by the expression 3 when the target pixel is darker than the peripheral pixel.

It should be noted that the gain curve GLUT shown in FIG. 7 is an example and the present invention is not limited to this example. Any shape may be accepted as long as the degree of enhancement when the target pixel is brighter than the peripheral pixel is small in comparison with G0 in FIG. 7, which is a linear gain. For example, a straight line may be accepted instead of a curve. In addition, when the target pixel is darker than the peripheral pixel, any shape may be accepted. For example, on the contrary to the example in FIG. 7, the degree of enhancement when the target pixel is darker than the peripheral pixel may be small in comparison with G0 in FIG. 7, which is a linear gain.

Furthermore, the gain curve GLUT is determined so that when the value of (Y [x, y]−Ylp [x, y]) is a positive value, the degree of enhancement is small in comparison with that when the value of (Y [x, y]−Ylp [x, y]) is a negative value. In general, when the gradation at a bright part is saturated, blown out highlights occur. Therefore, it is possible to prevent washed-out highlights from becoming conspicuous by reducing the degree of enhancement as described above at the bright part.

As explained in step S7, by performing gradation conversion processing according to the gradation curve G2, the gradation is softened, and thus, it is possible to maintain the apparent contrast by appropriately setting the gain curve GLUT to adjust the local contrast. The gain curve GLUT may be a fixed gain curve or a varying gain curve.

For example, it may also be possible to set a configuration in which the controlling part 17 determines the gain curve GLUT according to the shooting mode (for example, "portray mode", "landscape mode", etc.). For example, in the portray mode, washed-out highlights in the bright part gradation or flat shadows in the dark part gradation are not preferred in many cases. Because of this, the controlling part 17 determines the gain curve GLUT in which the degree of enhancement is small at both the bright part and the dark part in the portray mode. Moreover, in the landscape mode, an image with high contrast is preferred in many cases. Because of this, the controlling part 17 determines the gain curve GLUT in which the degree of enhancement is large at both the bright part and the dark part in the landscape mode.

Furthermore, it may also be possible to set a configuration in which the controlling part 17 determines the gain curve GLUT according to the magnitude of the contrast of an image or to set a configuration in which it is determined according to the adjusting mode of an image. Furthermore, it may also be possible to set a configuration in which the gain curve GLUT is determined according to the result of image determination by the scene analysis or face recognition. By appropriately determining the gain curve GLUT as described above, it is possible to perform gradation conversion processing and local contrast enhancement processing optimized on an image.

Figure 8:
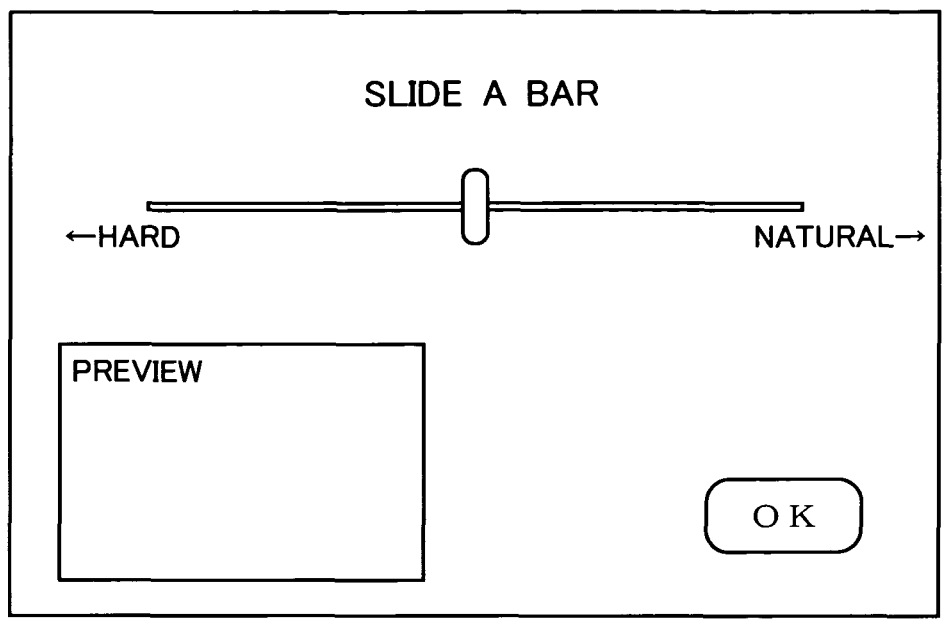
FIG. 8 is a diagram for explaining determination of a gamma curve.

Furthermore, it may also be possible for the controlling part 17 to determine the gain curve GLUT based on the user's operation via the switching member 29. For example, the controlling part 17 displays a specification screen, as shown in FIG. 8, on which the characteristics at the time of image processing are specified, in the image displaying part 27. A user specifies the characteristics at the time of image processing by moving a slide bar via the switching member 29. In the example in FIG. 8, the terms "harder" or "more natural" are used, but these are examples and any terms may be used as long as they indicate the characteristics at the time of image processing according to the gain curve GLUT described above. Then, the controlling part 17 determines the gain curve GLUT according to the characteristics at the time of image processing specified by the user. For example, in the example in FIG. 8, when the characteristics specified by the user are closer to "more natural", the gain curve GLUT the total degree of enhancement of which is smaller is determined and when the characteristics specified by the user are closer to "harder", the gain curve GLUT the total degree of enhancement of which is larger is determined. It should be noted that when causing a user to specify the characteristics at the time of image processing, a configuration may be set in which a preview screen is provided as illustrated in FIG. 8 and the user can check the result of image processing in accordance with the specified characteristics.

Figure 9:
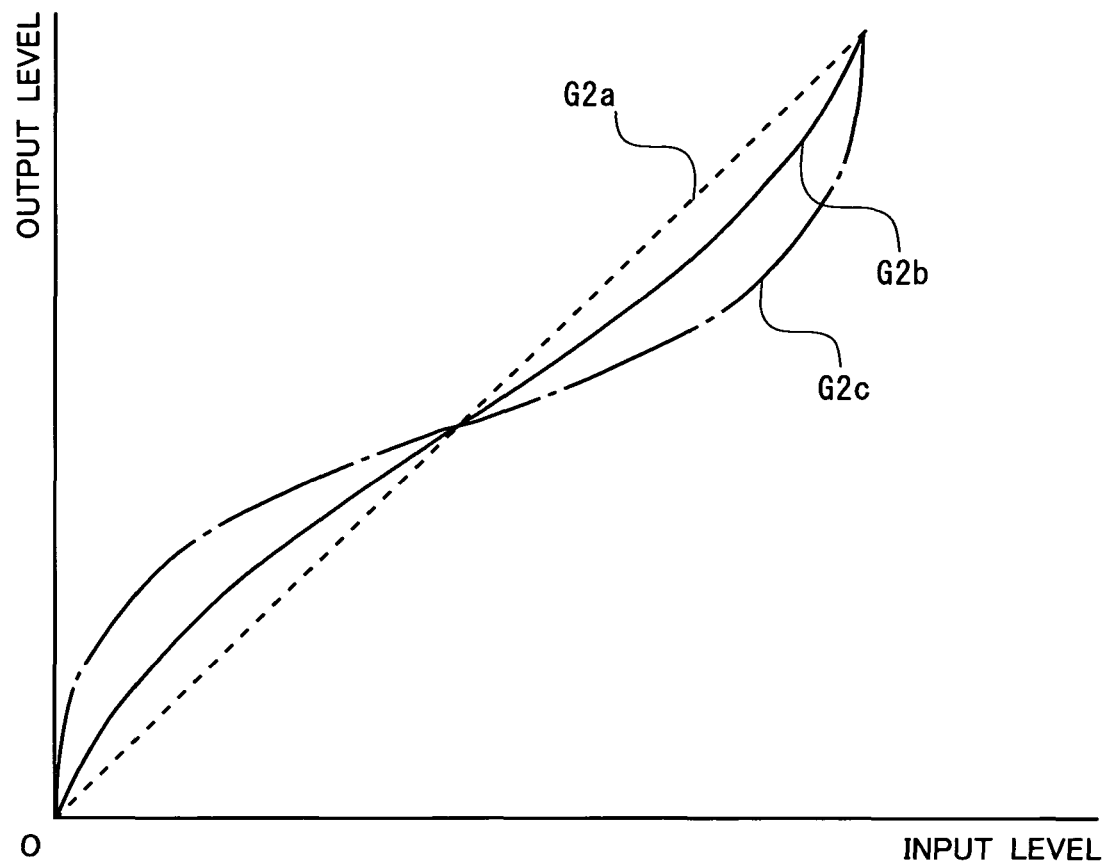
FIG. 9 is another diagram for explaining a gradation curve.

Furthermore, the controlling part 17 may determine the gain curve GLUT in association with the gradation curve G2 explained in step S6. For example, as shown in FIG. 9, a plurality of gradation curves G2a to G1c with different S-shaped characteristics is prepared and it is made possible to select any of the gradation curves in step S6. Then, the gain curve GLUT is determined according to the characteristics of the selected gradation curve. That is, it may also be possible to determine the degree of local contrast enhancement processing in step S8 according to the degree of gradation softening by the gradation conversion processing in step S7.

It should be noted that the controlling part 17 may make use of the gradation curve G2 explained in step S6 and the gain curve GLUT explained in step S8, respectively, by selecting any curve from among a plurality of curves stored in advance, or may make use of the gradation curve and the gain curve after appropriately adjusting them.

In step S9, the controlling part 17 stores the image data having been subjected to the local contrast enhancement processing in step S8 in the memory card 28 via the card interface 25 and completes the series of processing. It should be noted that image compression processing OPEC compression processing etc.) may be performed as necessary via the compression/extension part 26 before storing image data in the memory card 28.

As explained above, according to the first embodiment, gradation conversion processing for image data is performed according to the input/output characteristics having the characteristic to which the characteristics to reduce contrast at the intermediate part of gradation are added and correction to enhance the local contrast indicative of the contrast at the local part of the image is made for the image data having been subjected to gradation conversion processing using a gain curve the degree of enhancement of which changes in accordance with the luminance information of the target pixel to be processed. Consequently, it is possible to improve the bright part gradation and the dark part gradation while suppressing the change in the hue and color saturation as well as maintaining contrast.

Moreover, it is possible to easily implement the local contrast enhancement processing explained in the first embodiment by improving the algorithm of contour enhancement processing widely used conventionally.

Furthermore, according to the first embodiment, correction to enhance the local contrast is made using a low pass filter the half value width (d in FIG. 6) of which is as wide as 1/100 or more of the short side of the image, and thus, it is possible to make correction based on the intermediate frequency component. Unlike in the case of the correction based on the ultrahigh frequency component, such as edge enhancement normally implemented for each pixel, by this correction, it is possible to obtain the effect to improve the bright part gradation and the dark part gradation while maintaining contrast by correcting the local contrast because the sense of sight of a human recognizes contrast locally.

<Second Embodiment>

A second embodiment of the present invention will be explained by using the drawings. The second embodiment is a modification of the first embodiment, and thus, only parts different from those in the first embodiment will be explained.

The configuration of an electronic camera of the second embodiment is the same as that of the electronic camera 1 in the first embodiment. Consequently, explanation will be given below by using the same symbols as those in the first embodiment.

Figure 10:
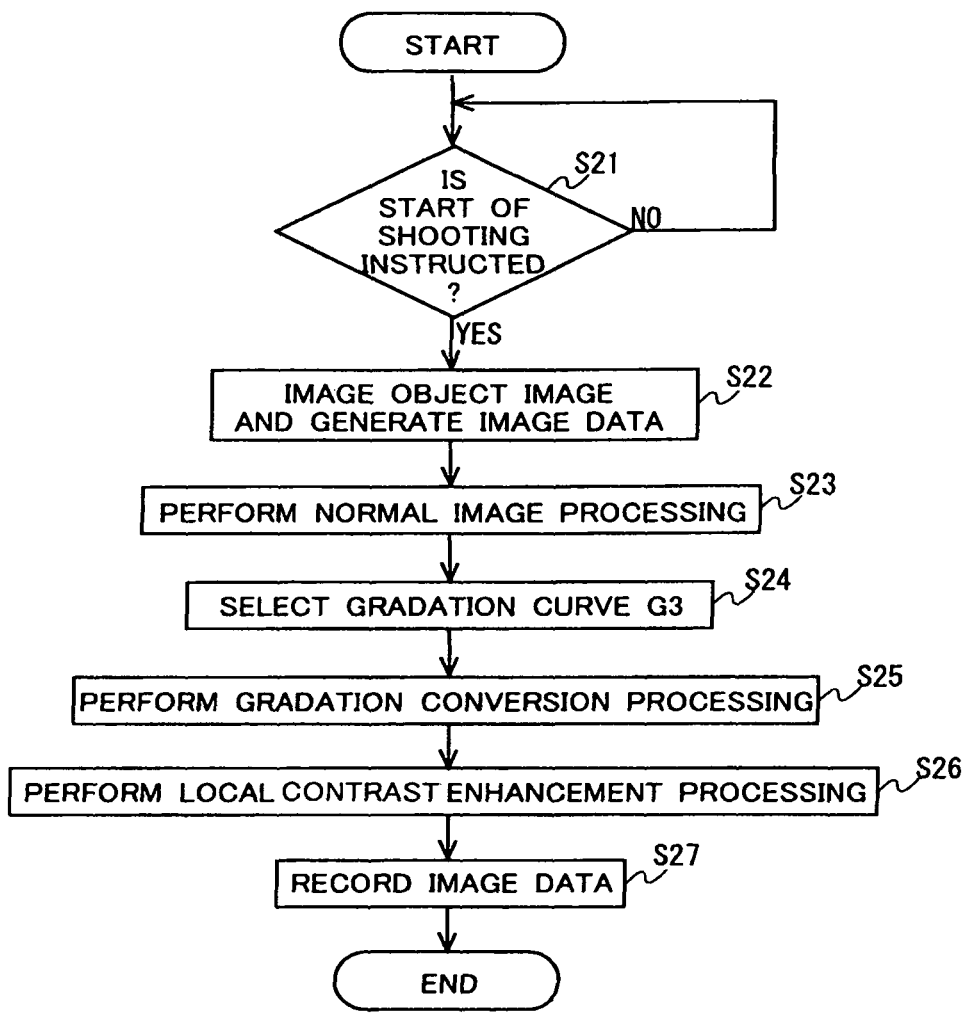
FIG. 10 is a flowchart showing the operation at the time of shooting of the electronic camera 1 in a second embodiment.

The flowchart in FIG. 10 shows the operation at the time of shooting of the electronic camera 1 in the second embodiment.

In step S21 to step S23, the controlling part 17 performs the same processing as that in step S1 to step S3 of the flowchart in FIG. 3.

Figure 11:
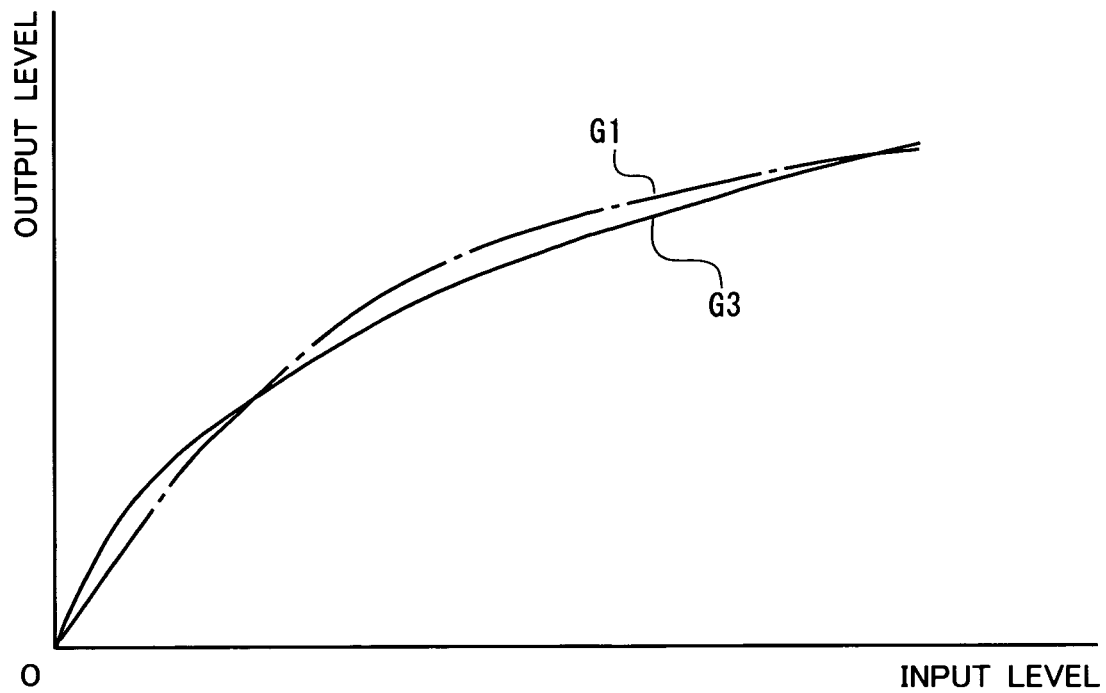
FIG. 11 is another diagram for explaining a gradation curve.

Then, in step S24, the controlling part 17 selects a gradation curve G3. As shown in FIG. 11, the gradation curve G3 is a gradation curve that has the characteristics of the gradation curve G1 and the characteristics of the gradation curve G2 explained using the flowchart in FIG. 3.

In step S25, the controlling part 17 performs gradation conversion processing on the image data having been subjected to image processing in step S23 according to the gradation curve G3 selected in step S24. That is, the controlling part 17 performs gradation conversion processing only one time using one gradation curve that has the normal characteristics (corresponding to G1) to which the characteristics (corresponding to G2) to reduce contrast are added.

In step S26 to step S27, the controlling part 17 performs the same processing as that in step S8 to step S9 of the flowchart in FIG. 3. By setting such a configuration, it is possible to obtain the same effect as that in the first embodiment.

It should be noted that in each of the embodiments described above, the example has been explained, in which the technique of the present invention is implemented in the electronic camera 1. However, the present invention is not limited to this. For example, it is also possible to apply the present invention to a compact electronic camera, a movie camera to shoot a moving image.

It may also be possible to implement the image processing device explained in each of the embodiments described above by software using a computer and an image processing program. In this case, a configuration is set, in which part or the whole of the processing in step S4 and subsequent steps explained in the flowchart in FIG. 3 is implemented by a computer. Alternatively, a configuration is set, in which part or the whole of the processing in step S24 and subsequent steps explained in the flowchart in FIG. 10 is implemented by a computer. It should be noted that such an image processing program may be one stored in a medium or one which can be downloaded from a server etc. via the Internet.

Furthermore, it is also possible to apply the present invention when the image to be processed is an image after having been subjected to gradation conversion processing using the gradation curve G1 explained in each of the embodiments described above. In this case, a configuration is set, in which part or the whole of the processing in step S6 and subsequent steps explained in the flowchart in FIG. 3 is implemented by a computer. Alternatively, a configuration is set, in which part or the whole of the processing in step S24 and subsequent steps explained in the flowchart in FIG. 10 is implemented by a computer.

The many features and advantages of the embodiments are apparent from the detailed specification and, thus, it is intended by the appended claimed to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable storage medium storing an image processing program causing a computer to execute an image processing on first image data to be processed, the image processing program comprising:
an obtaining step obtaining the first image data;
a gradation conversion processing step performing a gradation conversion processing on the first image data obtained by the obtaining step at an intermediate part of gradation by a gradation curve having characteristics to reduce a contrast;
a low pass processing step generating second image data by performing a low pass processing on the first image data on which the gradation conversion processing is performed in the gradation conversion processing step; and
a correcting step making a correction to the first image data on which the gradation conversion processing is performed in the gradation conversion processing step by a gain curve having characteristics to increase a luminance value when a luminance value of the first image data is larger than a luminance value of the second image data and to decrease the luminance value when the luminance value of the first image data is smaller than the luminance value of the second image data by comparing the luminance value of the first image data on which the gradation conversion processing is performed in the gradation conversion processing step with the luminance value of the second image data, wherein
a gradient of the gain curve is higher when the luminance value of the first image data is smaller than the luminance value of the second image data than when the luminance value of the first image data is larger than the luminance value of the second image data.

2. The non-transitory computer-readable storage medium storing the image processing program according to claim 1, wherein
in the correcting step, image data of a blurred image is generated based on the first image data and the correction is made based on a value indicative of a difference between a luminance value in the first image data and a luminance value in the image data of the blurred image.

3. The non-transitory computer-readable storage medium storing the image processing program according to claim 1, wherein
in the correcting step, image data of a blurred image is generated based on the first image data and the correction is made to reduce the degree of enhancement when a value indicative of a difference between a luminance value in the first image data and a luminance value in the image data of the blurred image becomes larger.

4. The non-transitory computer-readable storage medium storing the image processing program according to claim 1, wherein
in the correcting step, image data of a blurred image is generated based on the first image data and the correction is made to increase the degree of enhancement when a value indicative of a difference between a luminance value in the first image data and a luminance value in the image data of the blurred image becomes smaller.

5. The non-transitory computer-readable storage medium storing the image processing program according to claim 1, wherein
the gradation curve is either a combination of a gradation curve having normal characteristics and a gradation curve having the characteristics to reduce the contrast, and or gradation curve having the normal characteristics to which the characteristics to reduce the contrast are added.

6. The non-transitory computer-readable storage medium storing the image processing program according to claim 2, wherein
the gradation curve is either a combination of a gradation curve having normal characteristics and a gradation curve having the characteristics to reduce the contrast, and or gradation curve having the normal characteristics to which the characteristics to reduce the contrast are added.

7. The non-transitory computer-readable storage medium storing the image processing program according to claim 3, wherein
the gradation curve is either a combination of a gradation curve having normal characteristics and a gradation curve having the characteristics to reduce the contrast, and or gradation curve having the normal characteristics to which the characteristics to reduce the contrast are added.

8. The non-transitory computer-readable storage medium storing the image processing program according to claim 4, wherein
the gradation curve is either a combination of a gradation curve having normal characteristics and a gradation curve having the characteristic to reduce the contrast, and or gradation curve having the normal characteristics to which the characteristics to reduce the contrast are added.

9. An image processing device comprising:
an obtaining part obtaining first image data to be processed;
a gradation conversion processing part performing a gradation conversion processing on the first image data obtained by the obtaining part at an intermediate part of gradation by a gradation curve having characteristics to reduce a contrast;
a low pass processing part generating second image data by performing a low pass processing on the first image data on which the gradation conversion processing is performed by the gradation conversion processing part; and
a correcting part making a correction to the first image data on which the gradation conversion processing is performed by the gradation conversion processing part by a gain curve having characteristics to increase a luminance value when a luminance value of the first image data is larger than a luminance value of the second image data and to decrease the luminance value when the luminance value of the first image data is smaller than the luminance value of the second image data by comparing the luminance value of the first image data on which the gradation conversion processing is performed by the gradation conversion processing part with the luminance value of the second image data, wherein
a gradient of the gain curve is higher when the luminance value of the first image data is smaller than the luminance value of the second image data than when the luminance value of the first image data is larger than the luminance value of the second image data.

10. An image processing method comprising the steps of:
obtaining first image data to be processed;
performing a gradation conversion processing on the first image data at an intermediate part of gradation by a gradation curve having characteristics to reduce a contrast;
generating second image data by performing a low pass processing on the first image data on which the gradation conversion processing is performed in the gradation conversion processing step; and making a correction to the first image data on which the gradation conversion processing is performed in the gradation conversion processing step by a gain curve having characteristics to increase a luminance value when a luminance value of the first image data is larger than a luminance value of the second image data and to decrease the luminance value when the luminance value of the first image data is smaller than the luminance value of the second image data by comparing the luminance value of the first image data on which the gradation conversion processing is performed in the gradation conversion processing step with the luminance value of the second image data, wherein a gradient of the gain curve is higher when the luminance value of the first image data is smaller than the luminance value of the second image data than when the luminance value of the first image data is larger than the luminance value of the second image data.

* * * * *

UNITED STATES PATENT AND TRADEMARK OFFICE
CERTIFICATE OF CORRECTION

| | | |
|---|---|---|
| PATENT NO. | : 8,989,510 B2 | Page 1 of 1 |
| APPLICATION NO. | : 13/086868 | |
| DATED | : March 24, 2015 | |
| INVENTOR(S) | : Muramatsu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this
Nineteenth Day of April, 2016

Michelle K. Lee
*Director of the United States Patent and Trademark Office*